United States Patent
Frost et al.

(10) Patent No.: US 12,450,358 B2
(45) Date of Patent: Oct. 21, 2025

(54) PROVISIONING SECURE BOOT DATA TO A REMOTE EXECUTION ENVIRONMENT

(71) Applicant: Arm Limited, Cambridge (GB)

(72) Inventors: Simon Thomas Frost, Hitchin (GB); Sami Ur Rehman Zia Ur Rehman Mujawar, Cambridge (GB)

(73) Assignee: Arm Limited, Cambridge (GB)

( * ) Notice: Subject to any disclaimer, the term of this patent is extended or adjusted under 35 U.S.C. 154(b) by 307 days.

(21) Appl. No.: 18/116,913

(22) Filed: Mar. 3, 2023

(65) Prior Publication Data
US 2024/0296228 A1 Sep. 5, 2024

(51) Int. Cl.
G06F 21/57 (2013.01)
G06F 21/53 (2013.01)
G06F 21/60 (2013.01)
G06F 21/74 (2013.01)

(52) U.S. Cl.
CPC ............ *G06F 21/575* (2013.01); *G06F 21/53* (2013.01); *G06F 21/602* (2013.01); *G06F 21/74* (2013.01)

(58) Field of Classification Search
CPC ........ G06F 21/53; G06F 21/57; G06F 21/575; G06F 21/602; G06F 21/74
See application file for complete search history.

(56) References Cited

U.S. PATENT DOCUMENTS

| | | | | |
|---|---|---|---|---|
| 10,742,421 B1 * | 8/2020 | Wentz | .............. | H04L 9/0897 |
| 11,816,236 B1 * | 11/2023 | Gupta | .............. | G06F 21/6218 |
| 2022/0222099 A1 * | 7/2022 | Srivastava | .......... | G06F 9/45545 |
| 2024/0037217 A1 * | 2/2024 | Kaul | .............. | H04L 63/166 |

* cited by examiner

*Primary Examiner* — Theodore C Parsons
(74) *Attorney, Agent, or Firm* — Leveque Intellectual Property Law, P.C.

(57) ABSTRACT

According to the present techniques there is provided a computer implemented method of securely provisioning data to a trusted operation environment hosted on a service, the method performed at the service, comprising: receiving, from a remote resource, a request for functionality at the service; allocating a trusted operation environment in response to the request; initiating a boot sequence at the trusted operation environment; establishing a secure communication session between the trusted operation environment and the remote resource; transmitting, from the trusted operation environment to the remote resource, a request for data; receiving, at the trusted operation environment, the requested data; accessing, at the trusted operation environment, the received data; progressing, at the trusted operation environment, the boot sequence using the received data.

15 Claims, 9 Drawing Sheets

PROVISIONING SECURE BOOT DATA TO A REMOTE EXECUTION ENVIRONMENT

BACKGROUND

The present techniques generally relate to the field of data processing and in particular relate to provisioning data.

Using secure data and storing such data secure in data processing systems, such that the data and the processing of that data is not accessible to malicious 3rd parties is useful in data processing systems.

The present applicant has recognised the need for provisioning data to, for example, operating environments hosted at a service.

BRIEF DESCRIPTION OF THE DRAWINGS

The techniques are diagrammatically illustrated, by way of example, in the accompanying drawings, in which.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

DETAILED DESCRIPTION

According to a first technique there is provided a computer implemented method of securely provisioning data to a trusted operation environment hosted on a service, the method performed at the service, comprising: receiving, from a remote resource, a request for functionality at the service; allocating a trusted operation environment in response to the request; initiating a boot sequence at the trusted operation environment; establishing a secure communication session between the trusted operation environment and the remote resource; transmitting, from the trusted operation environment to the remote resource, a request for data; receiving, at the trusted operation environment, the requested data; accessing, at the trusted operation environment, the received data; progressing, at the trusted operation environment, the boot sequence using the received data.

According to a further technique there is provided a computer implemented method of securely provisioning data on an operation environment hosted on a service, the method performed at a resource remote from the service comprising: establishing a secure communication session with an operation environment hosted at the service, and where the operation environment is to perform a boot sequence; receiving, from the operating environment during a boot sequence, a request for boot data; validating the request; provisioning, at least a portion of the boot data on the operating environment, based on or in response to a result of the validation.

According to a further technique there is provided a non-transitory data carrier carrying code which, when implemented on a processor, causes the processor to carry out the methods described herein.

A network may comprise multiple connected devices and services with different functionalities. The devices and services may be provided by different parties.

Broadly speaking, embodiments of the present techniques provide secure functionality at a host service (hereafter "service") for a remote client resource such as a client device (hereafter "device"), which may be a proxy device for a customer of the service. The remote client resource may also comprise one or more software entities such as a series of software components running, for example, on a server, that manage the user request for functionality on behalf of the customer.

In particular, the present techniques provide for providing boot data (e.g. parameters, instructions, variables, credential data required for a boot process) to the service.

Figure 1:
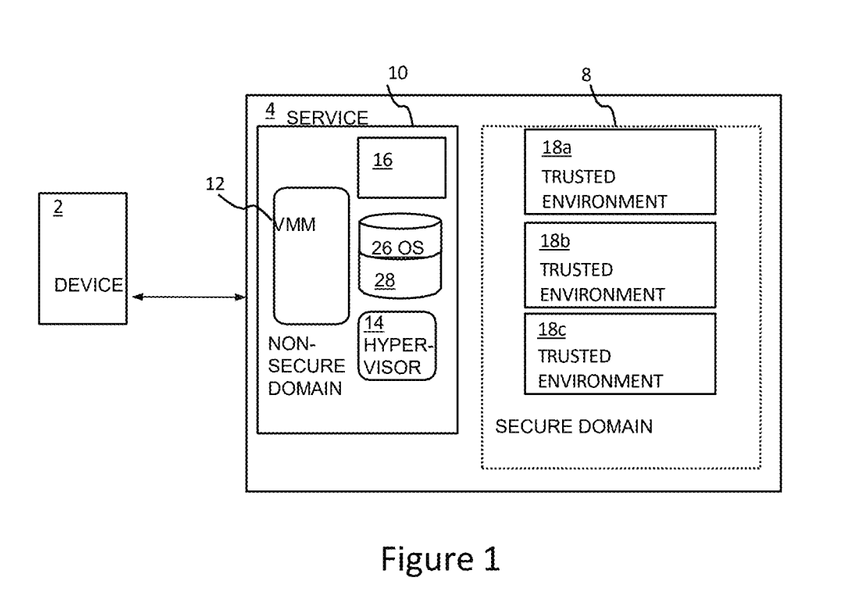
FIG. 1 shows a deployment scenario for a remote resource operable to communicate with a host service to access functionality thereat.

FIG. 1 shows a deployment scenario 1 for a client resource 2 operable to communicate with a service 4 to access functionality thereat. In the following illustrative examples the client resource 2 is taken to be a device 2.

Device 2 may be a hardware entity such as a computer terminal, a laptop, a tablet or mobile-phone, or may, for example, be a lightweight machine to machine (LwM2M) device.

Service 4 may comprise hardware/software capable of providing server functionality, for example to provide access to one or more execution environments (e.g. a virtual execution environment or virtual machine). The service 4 may, for example, be a cloud service comprising confidential compute architecture on one or more servers distributed across one or more networks.

An operating state of the service 4 may be partitioned between a secure operating state and a non-secure operating state, where architecture isolates software running in a secure state, as represented by the secure domain 8, from software running in a non-secure state, as represented by the non-secure domain 10. Such functionality enables an architecture in which code in the secure domain 8 is protected from code in the non-secure domain 10. The partitioning may be provided using, for example, TrustZone® architecture provided by ARM® Limited of Cambridge, UK.

Additionally, or alternatively, the operating state may also be further partitioned (e.g. by a management unit 12) into one or more protected or trusted operation environment(s) 18 (three of which 18a-18c are depicted in FIG. 1), with ownership of each trusted operation environment allocated to an owner process.

The owner process (hereafter "realm") may have the exclusive rights to access hardware components or software components of the trusted operation environment 18 allocated to that realm, and non-owner processes, even when in the secure domain 8 or, for example, as part of another trusted environment (e.g. 18b/18c), may not access hardware components or software components of the trusted operation environment 18.

In the following illustrative examples, the owner process or realm is described as a confidential virtual machine. However, the claims are not limited in this respect and the realm may comprise other suitable processes. Management and control of which trusted operation environment(s) 18 are allocated to each realm may be performed by a process other than the owner process itself. For example a process or component in the non-secure domain 10, for example a hypervisor 14 may, in collaboration with the management unit 12, be used to control which memory regions are allocated to the realm, whereby that hypervisor 14 itself does not have the rights to access data stored within the trusted operation environment's 18 storage (e.g. volatile or non-volatile memory).

Thus, a trusted operation environment 18 allocated to a particular realm provides isolation from hardware and software components outside of the trusted operation environment 18. In embodiments some trusted HW and/or SW components outside the trusted operation environment at the service 4 may access the trusted operation environment. Such components are part of a trusted computing base, and may include, for example, firmware components. Allocation of a component to the trusted compute base may be managed by the management unit 12. A further HW or SW access component (not shown) (e.g. comprising memory access circuitry) may be provided at the service 4 to, in collaboration with the management unit 12, enforce ownership rights of the allocated memory regions and provide access to the trusted operation environment for the trusted compute base.

The trusted operation environment functionality may be provided using Confidential Compute Architecture (CCA) from by ARM® Limited of Cambridge, UK., where the CCA may comprise a Real Management Extension (RME) and CCA firmware.

The device 2 may communicate with the service 4 using wireless communication, such as communication using wireless local area network (Wi-Fi), short range communication such as radio frequency communication (RFID) or near field communication (NFC), or communications used in wireless technologies such as ZigBee, Thread, Bluetooth, Bluetooth LE, IPV6 over Low Power Wireless Standard (6LoWPAN) or Constrained Application Protocol (CoAP) and/or using a cellular network such as 3G, 4G or 5G. Additionally, or alternatively, the device 2 may communicate with the service 4 using wired communication such as using a fibre optic or metal cable.

The device 2 and service 4 may communicate using appropriate standards or protocols such as open IETF standards such as CoAP over a first network, such as, for example, a low-power wireless network using 6LoWPAN, although any suitable standard(s)/protocol(s)/network(s) may be used. It will be appreciated that one or more intermediary devices, such as a gateway device, edge device etc. may be located between the device 2 and resource server 4.

The device 2 and service 4 may each comprise (e.g. in respective storage) credential data such as one or more of: certificates, cryptographic key data (e.g. shared symmetric keys, public keys, private keys), and identifiers (e.g. direct or indirect identifiers) etc.) whereby such credential data may be used by the device 2 and service 4 to authenticate with one another and/or one or more further resources (e.g. a bootstrap server/attestation service). The cryptographic key data (e.g. shared symmetric keys, public keys, private keys) can be used to encrypt data during a secure communications session.

The present techniques provide for provisioning data on the service 4 in a secure manner, where the data is to allow the service 4 to perform a secure boot at a trusted operation environment, where the trusted operation environment provides functionality requested by a resource remote from the service (e.g. the device 2).

Figure 2:
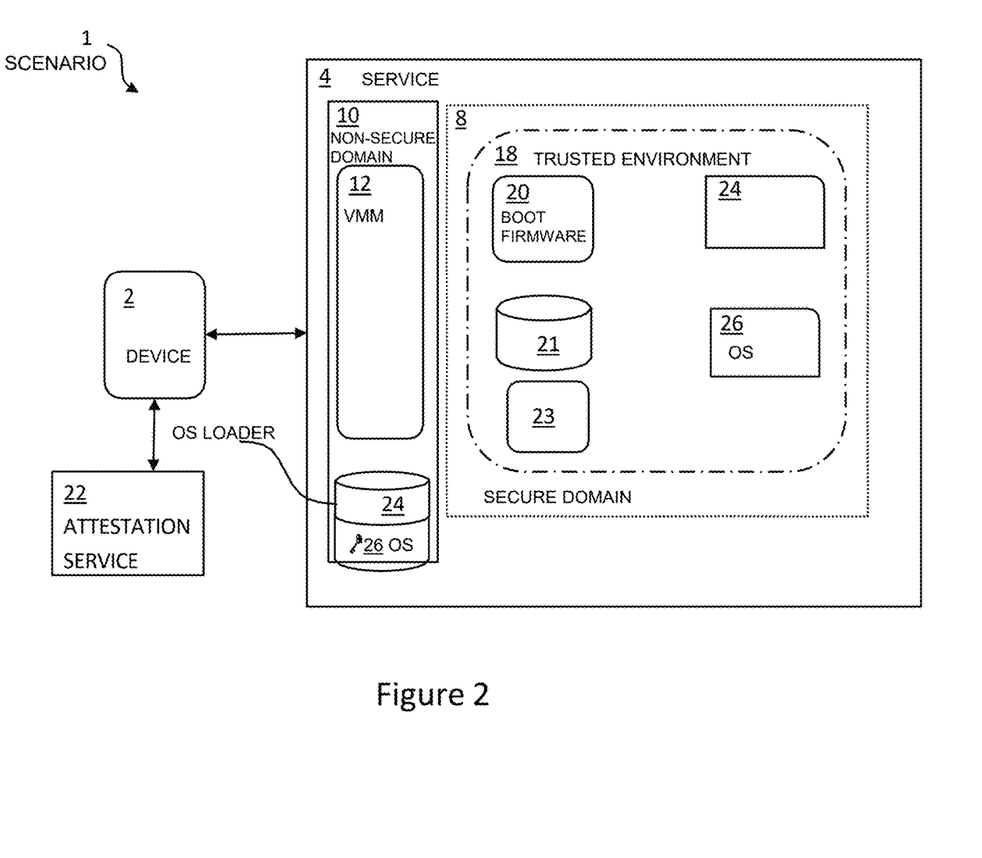
FIG. 2 schematically shows a high level diagram of a system comprising the device and service.

FIG. 2 schematically shows a high level diagram of a system 1 comprising the device 2 and service 4, where service 4 comprises a trusted operation environment 18 to provide functionality requested by the device 2.

When a request for functionality is received from device 2, a secure domain 8 is partitioned to define a trusted operation environment 18 for the realm, and an owner allocated to the realm. In the present illustrative example, the owner is taken to be the virtual machine process which was requested by the device 2.

In the present illustrative examples, the management unit 12 comprises a virtual machine manager (VMM), which is responsible for defining the trusted operation environment 18 for the realm and allocating the correct owner process. For example, the VMM 12 allocates memory address space to the trusted operation environment 18, and where, for example, a further HW or SW access component (not shown) may be provided at the service 2 (e.g. in the secure region 8) to, in collaboration with the VMM 12, enforce ownership rights of the allocated memory regions. For example, the further access component (not shown) may provide access to the trusted operation environment to components in the trusted compute base but prevent access to other components outside of the trusted operation environment 18.

VMM 12 also loads boot firmware (hereafter "boot manager code") 20 into the trusted operation environment 18 for the realm, where the boot manager code is to initiate and manage a boot sequence or boot process to load an operating system for the realm.

In the present illustrative example, the boot manager code 20 comprises Unified Extensible Firmware Interface (UEFI) code, although the claims are not limited in this respect. The UEFI code uses an available communications interface at the service 4 to enable communications between the trusted operation environment and HW/SW components outside the trusted operation environment 18, or more specifically between the trusted operation environment 18 allocated to the realm and HW and/or SW components outside the trusted operation environment 18.

In embodiments, the trusted operation environment 18 (or at least HW/SW components thereof) is to securely communicate with device 2 to allow the device to provision data therein in a secure manner. However, the trusted operation environment 18 may, initially (e.g. before OS code is loaded), have limited communications capabilities and the service 4 may not be trusted by the device 2. In the present illustrative examples, the device 2 and trusted execution environment 18 can derive cryptographic keys (e.g. symmetric or asymmetric keys)) which can be used to secure communications therebetween during a secure communication session (e.g. by encrypting/decrypting and signing/verifying communications the communications using the keys).

Thus, whilst the secure communication session is established between the trusted operation environment 18 and device 2 any secure communications transmitted therebetween may pass through other HW/SW components outside the trusted operation environment 18, for example, via the VMM 12, although the HW/SW components outside the trusted operation environment 18 will not have access to the data in the communications as they will be encrypted using the negotiated cryptographic key(s).

As will be described below, one or more request(s) for data may be transmitted from the trusted operation environment 18 during the secure communications session, where the one or more request(s) may comprise verifiable evidence that a relying party can process to verify one or more attributes/characteristics of the trusted operation environment 18 allocated to the realm and to determine if the realm can be trusted (e.g. that the trusted operation environment 18 was operating as expected at the time the trust request was generated and/or that there was no evidence of malicious code running in the trusted operation environment 18).

In the following illustrative examples, the one or more requests for data comprise(s) an attestation report which includes verification data to allow a relying resource (e.g. device 2 or attestation service 22) to determine if the realm or trusted operation environment 18 can be trusted. Such a request for data comprising verification data is hereafter referred to as a "trust request".

In embodiments the attestation report may be produced by a trusted HW or SW component that is part of the trusted compute base and can access the trusted operation environment 18 (e.g. read from/write to memory allocated to the trusted operation environment). Such a trust request may be generated, for example, in response to a call or request from, for example, the boot code manager 20.

The attestation report, may include measurements, information or identifiers to allow a relying party to verify the one or more attributes/characteristics of the trusted operation environment 18 allocated to the realm or the service 4 itself, where the measurements, information or identifiers may comprise one or more of:

an identifier (e.g. a hardware or software identifier) such as for the service 4 itself or one or more HW or SW component(s) of the trusted compute base. As an illustrative example, the HW/SW component that generates the attestation report may provide evidence (e.g. an identifier or signature) in the attestation report to allow a relying party verify that a trusted component generated the report;

origin details of the firmware used to boot the hardware platform;

initial state of the realm before execution (e.g. a hash of the memory containing initial realm firmware (e.g. placed there by the VMM 12).

general purpose measurements registers (GPMR) (e.g. maintained by a realm manager (RMM) (not shown) at the service 4) where code stores values into the registers by calling an ABI (application binary interface) exposed by the RMM. Such values are 'extended' into existing values in the GPMR rather than being simply stored, where a New Value of the register=Hash(Previous Value||Passed New Value), where || is concatenation;

a timestamp of the time at which the attestation report was generated.

As an illustrative example, a component of the trusted compute base (e.g. the RMM (not shown)) may, in response to a call or request, perform a validation measurement to verify that the boot manager code (e.g. UEFI code) is loaded and performing as expected. Such a measurement may comprise performing a calculation (e.g. hash algorithm) over the memory region (or portion thereof) allocated to the realm to generate a checksum, where the checksum can be used by a relying party to verify that the checksum generated for the memory region allocated to the realm matches an expected checksum.

When incorrect or malicious boot manager code is loaded into the memory region then the checksum generated would not match an expected checksum.

The attestation report is sent from the trusted operation environment, via the VMM 12, to the device 2 for validation.

Validation of the attestation report may comprise, for example:

Deserialising the attestation report into the set of evidence claims & signature;

Identifying the signing entity and using that to verify the signature on the report;

Checking the measurements on the platform firmware against a set of reference values provided by the manufacturer to confirm that the firmware is up to date and does not contain any vulnerabilities.

Whilst the device 2 may itself validate the attestation report, due to the complexity of obtaining, for example, details of the signer and firmware reference values from the manufacturer, the validation may comprise sending the attestation report to a trusted remote resource, such as attestation service 22.

When the attestation report is verified (i.e. when it is determined that the realm can be trusted), the trusted operation environment is provisioned with data, for example, to enable the boot sequence to continue (hereafter "boot data"), where such boot data may include parameters, instructions and/or variables 21 to progress the boot sequence. Such parameters, instructions and/or variables may be part of a secure boot database, used, for example, by the UEFI code.

The boot data may also include boot credential data 23 which may comprise certificate(s) for data verification and/or cryptographic keys or cryptographic key data to allow the trusted operation environment 18 to derive cryptographic keys. Such boot credential data may comprise a secure boot key database (SBKD) used, for example, by the UEFI code.

The boot manager code 20 can use the received boot data to continue the boot sequence. As an illustrative example, the UEFI code will access the secure boot database 21 and use the data therein to access an OS loader 24 (e.g. in a non-secure memory region) and load the OS loader 24 into the trusted operation environment 18 allocated to the realm and run the OS loader 24 therein.

In embodiments the boot manager code 20 may, before loading and/or running the OS loader 24 in the trusted operation environment, verify that the OS loader 24 is trusted code (e.g. by verifying a signature of the OS loader using, for example, a certificate in the boot credential data).

The OS loader 24 running in the trusted operation environment 18 will use the boot credential data to access an encrypted OS 26, and run that OS in the trusted operation environment 18 to provide the confidential virtual machine functionality.

Figure 3:
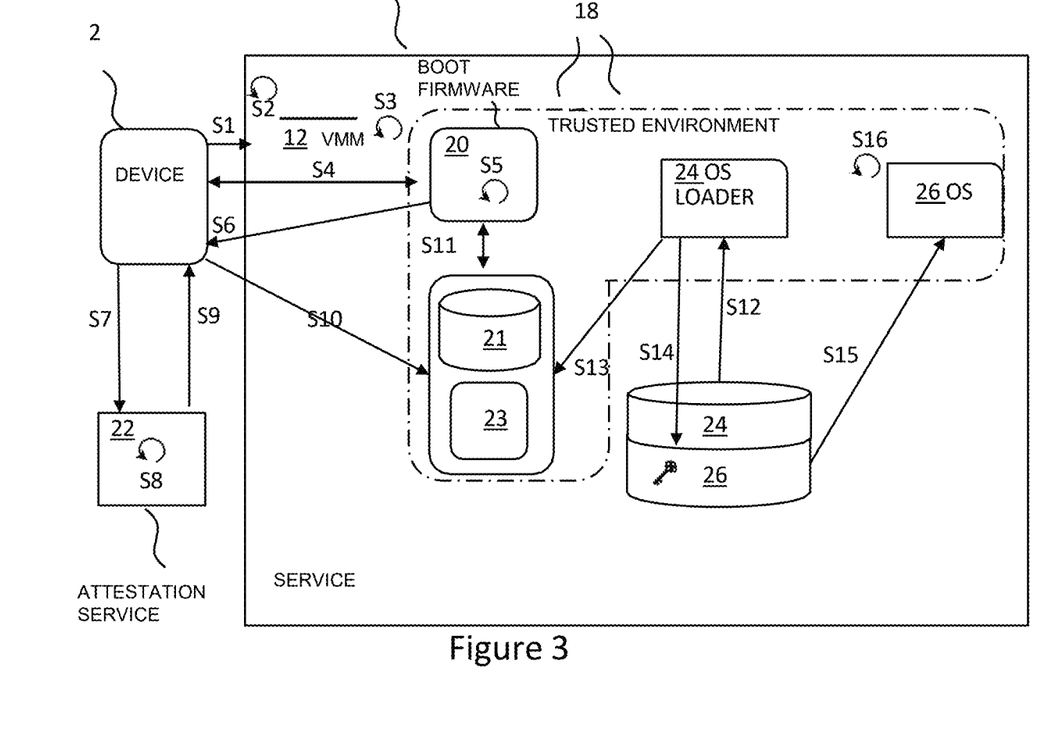
FIG. 3 schematically shows a sequence of provisioning data to a trusted operation environment at the service in accordance with an embodiment.

FIG. 3 schematically shows an example sequence for provisioning data, such as the boot data in accordance with an embodiment.

Like features in FIG. 3 will use similar numbering as used previously.

At S1, the device 2 communicates with the service 4 to request functionality, which in the present illustrative example is a request for a confidential virtual machine. Such communications may be received at a communications interface at the service 4.

At S2, the service 4 processes the request from the device 2, and determines whether or not the request is valid. Such a determination may be based on credential data provided in the request (e.g. device credentials and/or device identifiers), and a hypervisor (not shown) may, in collaboration with the VMM, allocate a trusted operation environment 18 for the realm.

At S3, the VMM 12 initiates a boot sequence or process, whereby boot manager code 20 (e.g. UEFI code) is loaded into memory (e.g. volatile memory) of the trusted operation environment 18 to manage a boot sequence.

At S4 the execution within the trusted operation environment begins and the realm and device 2 establish a secure communication session, for example using Diffie-Hellman (DH) key exchange.

At S5 the boot manager code 20 initiates the boot sequence and determines that further boot data is required to advance or progress the boot sequence. Such further boot data may comprise, for example, credential data to access encrypted OS code required to provide the requested functionality. Furthermore, the boot data may comprise parameters, instructions and/or variables required for the boot sequence.

At S6, the boot manager code 20 sends, to the device 2, via the communications infrastructure at the service 4, a trust request for the further boot data. In the present illustrative example the trust request comprises an attestation report which includes verification data to allow a relying resource to verify the one or more attributes or characteristics of the trusted operation environment 18. Although the communications pass via the communications infrastructure outside of the trusted operation environment 18, the components of the communications infrastructure or those outside the trusted execution environment cannot access the data in the communications, as the data is encrypted using the keys determined for the secure communication session.

Whilst the device 2 could validate the attestation report itself, FIG. 3 depicts attestation service 22 as a trusted resource remote from both the device 2 and service 4, where, at S7, the device 2 sends the attestation report to the attestation service 22 for validation.

At S8, the attestation service 22 validates the attestation report to determine whether or not the data therein is valid/as expected and, thus, that device 2 can rely on the data therein. In embodiments the attestation report may be opaque or not accessible to the device 2. Such opacity may be provided by the trusted HW or SW component that generated the attestation report encrypting the attestation report using credential data accessible thereto (e.g. in storage in a non-secure region of memory on the service).

At S9, the attestation service 22 transmits an attestation result to the device 2.

When the attestation result confirms that the attestation report is not valid/not as expected then the device 2 can take an appropriate action. For example, the device 2 can terminate communications with the realm and re-request the functionality from the service 4.

When the attestation result confirms that the attestation report is valid/as expected then the device 2, at S10, the device 2 provisions the boot data into the trusted operation environment 18. In the present illustrative example, the boot data comprises parameters, instructions and/or variables for the boot manager code 20 and boot credential data required to access the encrypted OS code.

The boot data transmitted to the trusted operation environment 18 is not accessible to the HW/SW components outside of the trusted operation environment. For example, the device 2 may encrypt the communications comprising the boot data using the cryptographic key (as described above) negotiated during the communication session.

At S11, the boot manager code 20 accesses the parameters, instructions and/or variables. The boot manager code 20 may also verify that the boot data is from a trusted source by, for example, verifying a signature on the boot data.

At S12, the boot manager code 20 loads the OS loader 24 into the trusted operation environment 18 allocated to the realm and runs the OS loader 24.

At S13, the OS loader 24 accesses boot credential data in the boot data provisioned by the device 2 and, at S14, decrypts encrypted OS code (e.g. comprising a Kernel and Root File System).

At S15, the OS loader 24 loads the decrypted OS code into the trusted operation environment 18 allocated to the realm (e.g. into volatile memory) and, at S16, runs the decrypted OS code to provide the requested confidential virtual machine functionality.

In embodiments, it may be beneficial for the boot data to be split, such that the parameters, instructions, variables and/or credential data, are provisioned in different communications (or during different communication sessions). For example, if a malicious $3^{rd}$ party software infiltrated trusted operation environment 18 allocated to the realm after the trust request was sent at S6, then the $3^{rd}$ party may access the boot credential data sent with the boot parameters, instructions and/or variables. Splitting the data over time (e.g. different points in the boot sequence) means that the device 2 can check (via the received trust request(s)) that the attributes or characteristics of the trusted operation environment are as expected for each point in the boot sequence.

Figure 4:
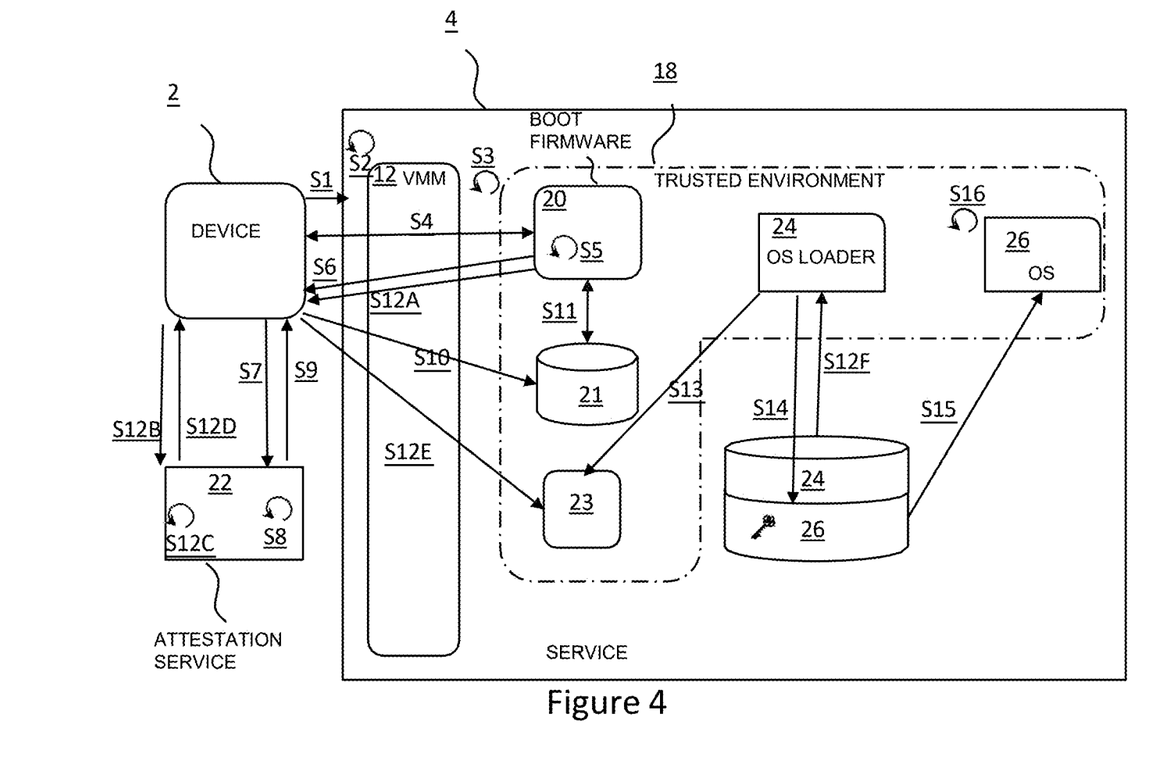
FIG. 4 schematically shows a sequence of provisioning data to a trusted operation environment at the service in accordance with a further embodiment.

FIG. 4 schematically shows a sequence for provisioning data such as the boot data in accordance with an embodiment.

Like features in FIG. 4 will use similar numbering as used previously.

At S1, the device 2 communicates with the service 4 to request functionality, such as a request for a confidential virtual machine. Such communications may be received at a communications interface at the service 4.

As above in FIGS. 2 & 3 the requested functionality is described as a request for a confidential virtual machine although the claims are not limited in this respect and any process may be requested.

At S2, the service 4 processes the request from the device 2 and determines whether or not the request is valid. Such a determination may be based on credential data provided in the request from device 2 (e.g. device credentials or device identifiers), and a hypervisor (not shown) may, in collaboration with the VMM 12, allocate a trusted operation environment 18 for the realm (i.e. the confidential virtual machine process).

At S3, the VMM 12 initiates a boot sequence or process, whereby boot manager code 20 (e.g. UEFI code) is loaded into memory (e.g. volatile memory) of the trusted operation environment 18 to manage a boot sequence.

At S4, the realm and device 2 establish a secure communication session, for example using Diffie-Hellman (DH) key exchange.

At S5, the boot manager code 20 initiates the boot sequence and determines that further boot data is required to advance or progress the boot sequence. Such boot data may comprise, for example, credential data to access encrypted OS code required to provide the requested functionality. Furthermore, the boot data may comprise parameters, instructions and/or variables required for the boot sequence.

At S6, the boot manager code 20 sends, from the trusted operation environment to the device 2, e.g. via VMM 12, a trust request for the boot data. In the present illustrative example the trust request comprises an attestation report which includes verification data to allow the relying resource to verify the one or more attributes or characteristics of the trusted operation environment.

As above, whilst the device 2 could validate the attestation report itself, FIG. 3 depicts attestation service 22 as a trusted resource remote from both the device 2 and service 4, where, at S7, the device 2 sends the attestation report to the attestation service 22 for validation.

At S8, the attestation service 22 validates the attestation report to determine whether or not the data therein is valid/as expected and, thus, that device 2 can rely on the data therein.

At S9, the attestation service 22 transmits an attestation result to the device.

When the attestation result confirms that the attestation report is valid/as expected then the device 2, at S10, the device 2 provisions boot data into the trusted operation environment 18. In the present illustrative example, the boot data comprises parameters, instructions and/or variables for the boot manager code 20.

As above, the boot data transmitted to the trusted operation environment 18 is not accessible to the HW/SW components outside of that trusted operation environment 18. For example, the device 2 may encrypt the communications comprising the boot data using the cryptographic key negotiated during the communication session as described in more detail below.

At S11, the boot manager code 20 accesses the secure boot database and obtains the parameters, instructions and/or variables to advance the boot sequence, and, for example, instructions on which particular OS loader to initiate/load. The UEFI code may also verify that the received boot data is trusted (e.g. from a trusted source) before processing the received boot data by, for example, decrypting the boot data and/or verifying a signature on the boot data.

At S12A, the boot manager code 20 determines that still further data is required to complete the boot sequence, and sends, to the device 2 via VMM 12, a further trust request.

In the present illustrative example, the further trust request includes further verification data to allow the relying resource to verify one or more attributes or characteristics of the trusted operation environment. In the present illustrative example, the further trust request comprises a further attestation report which includes the further verification data.

At S12B, the device 2 sends the further attestation report to the attestation service 22 for validation.

At S12C, the attestation service 22 validates the further attestation report to determine whether or not the data therein is valid/as expected and, thus, whether or not the device 2 can rely on the data therein.

At S12D, the attestation service 22 transmits a further attestation result to the device 2.

When the further attestation result confirms that the further attestation report is valid/as expected then the device 2, at S12E, provisions some or all of the requested further boot data into the trusted operation environment 18 allocated to the realm, where, in the present illustrative example, the further boot data comprises boot credential data to provide access to (e.g. decrypt/verify) encrypted OS code required to provide the requested functionality at S1. Furthermore, as the communication comprising the further boot data is protected by the device 2 (e.g. encrypted and/or signed by the device 2) using a cryptographic key negotiated with the realm, the boot data transmitted to the trusted operation environment is not accessible to the HW/SW components outside of the trusted operation environment.

At S12F, when it is determined that all required boot data has been received, the boot manager code 20 loads the OS loader 24 into the trusted operation environment 18 allocated to the realm and runs the OS loader 24.

At S13, the OS loader 24 running in the trusted operation environment 18 accesses the boot credential data in the further boot data provisioned by the device 2 and at S14 decrypts encrypted OS code (e.g. comprising a Kernel and Root File System), where the OS code may be stored in storage (e.g. in non-volatile memory) outside of the trusted operation environment 18 (e.g. in a non-secure region at the service 4).

In embodiments, portions of the OS code may be stored in different partitions of storage, where, for example, a first cryptographic key may required to access a first portion of the OS code, and a second (or more) cryptographic keys may required to access a second (or more) portions of the OS code, where the cryptographic key required to access each portion may be provisioned from the device 2 (or another resource) in response to a trust request.

At S15, the OS loader 24 loads the decrypted OS code into the trusted operation environment 18 allocated to the realm (e.g. into volatile memory) and, at S16, runs the decrypted OS code to provide the requested confidential virtual machine functionality.

Figure 5A:
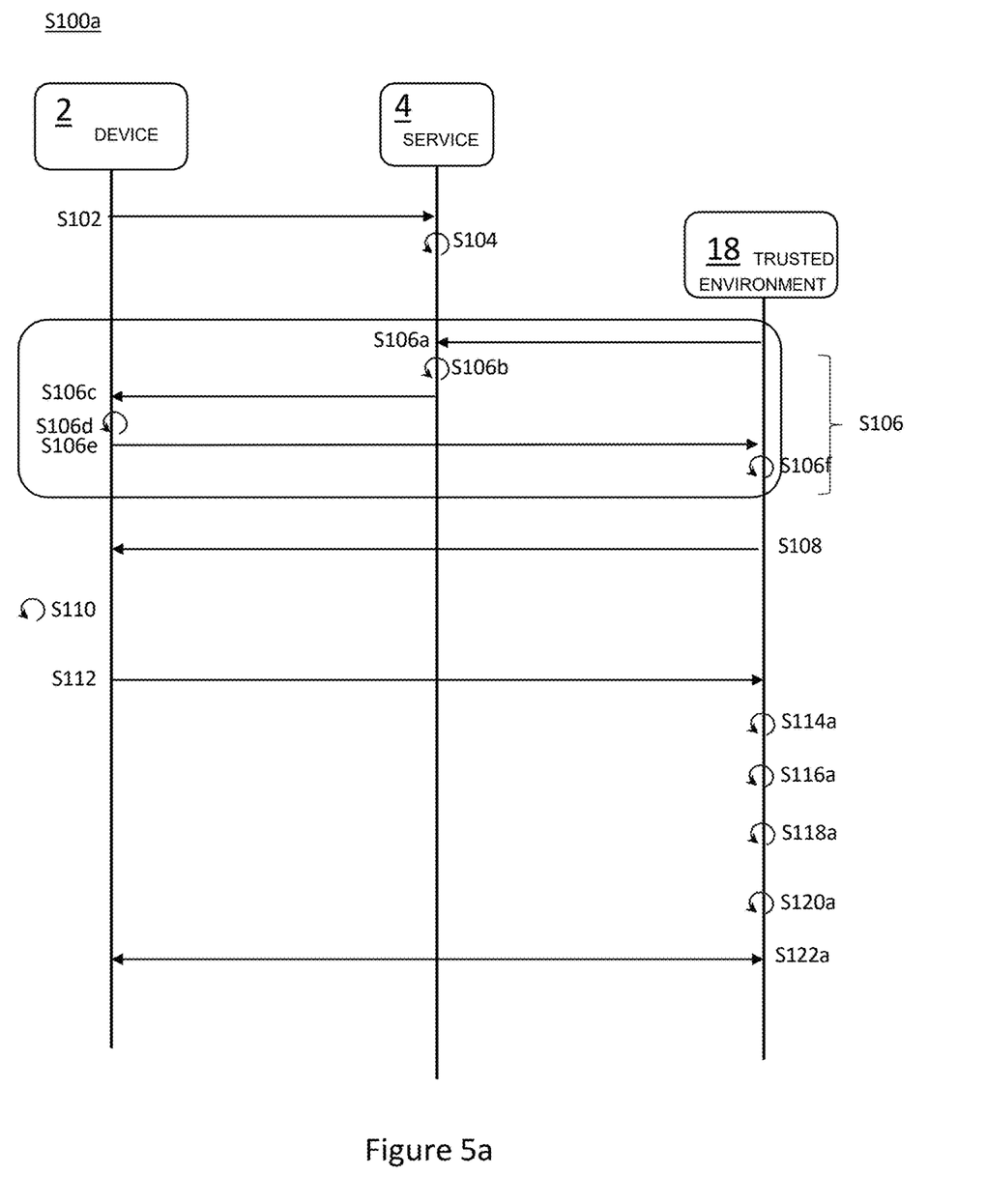
FIG. 5a schematically shows an example communication flow in which the service is provisioned with data.
Figure 5B:
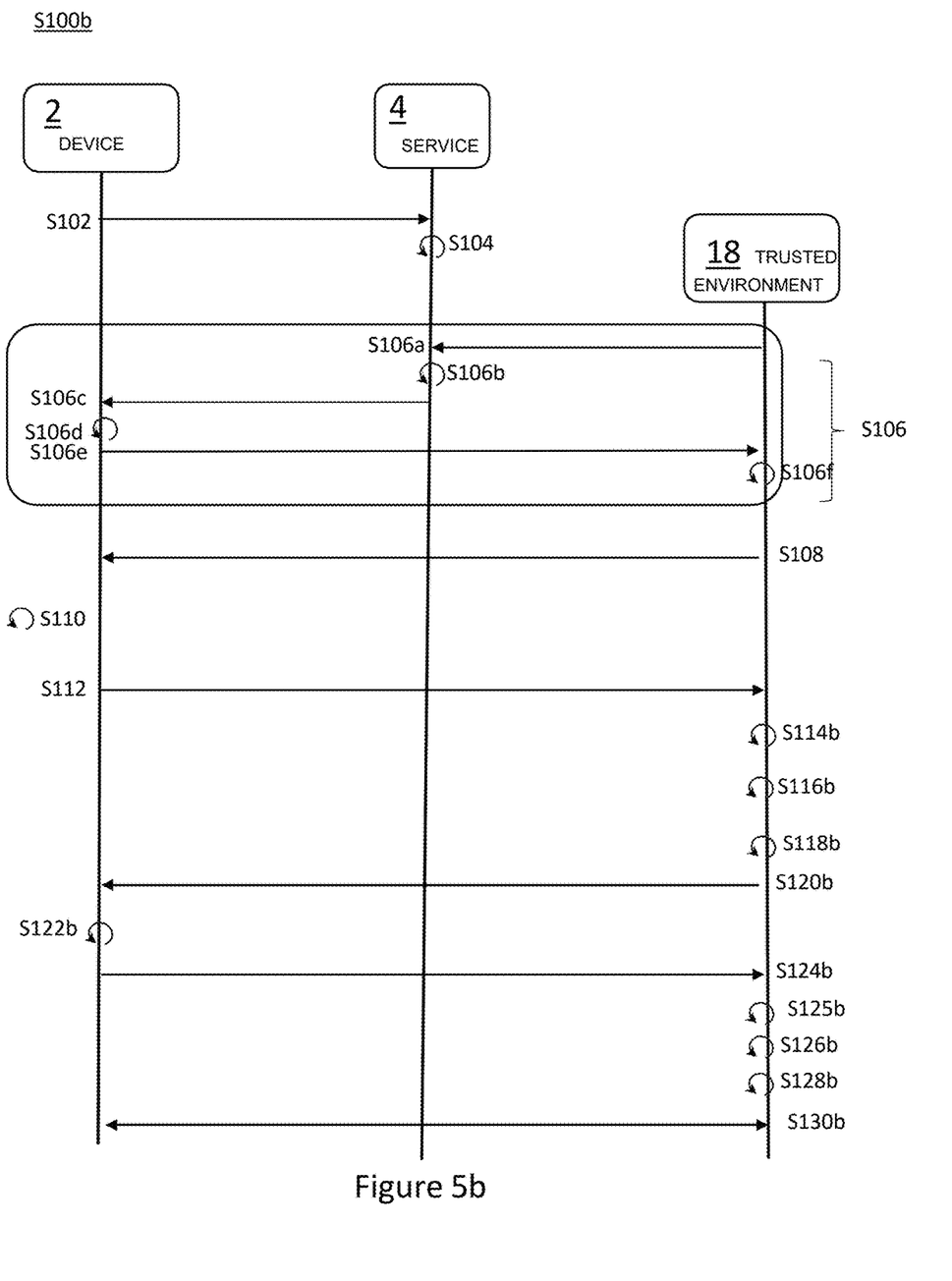
FIG. 5b schematically shows an example communication flow in which the service is provisioned with data.

FIG. 5a schematically shows an example communication flow 100a in which a service 4 is provisioned with boot data to provide trusted functionality for device 2 and FIG. 5b schematically shows a further example communication flow 100b in which a service 4 is provisioned with boot data to provide trusted functionality for device 2.

At S102, the device 2 communicates with the service 4 to request functionality, such as a request for a confidential virtual machine. Such communications may be received at a communications interface at the service 4.

At S104, the service 4 processes the request from the device 2 and, allocates a trusted operation environment 18 for the realm to provide the requested functionality. Such an allocation may be managed or controlled by, for example, the VMM 12 on the service 4.

To initiate a boot sequence or process, the VMM 12 loads boot manager code 20 (e.g. UEFI code) into the trusted operation environment 18 (e.g. into volatile memory), where boot manager code 20 is to manage a boot sequence.

S106 illustratively depicts an example negotiation during which a trusted operation environment 18 can establish a secure communication session with device 2, such that communications sent between the device 2 and trusted operation environment 18 during the communication session can be protected or secured using a shared cryptographic key (K).

In the present illustrative example the shared cryptographic key (K) is derived using a Diffie-Hellman (DH) key exchange, although the claims are not limited in this respect.

The trusted operation environment 18 (e.g. firmware code therein), at S106a, issues a call or request to a HW and/or SW component (e.g. VMM 12) on the service 4, where the call or request comprises a payload for a destination resource.

In the present illustrative example, the payload comprises parameters (e.g. public parameters (m, b) and a DH public value (R)) to allow the destination resource to derive a cryptographic key (K).

At S106b, a component at the service 4 (e.g. the VMM) processes the call or request and identifies the device 2 as the destination resource, and at S106c, passes the payload to the device 2.

At S106d, the device 2 accesses the payload and derives shared key (K) based on or in response to one or more of the parameters (m, b) and the public value (R) therein. Device 2 also calculates a DH public value (U) which, at S106e, is provisioned to the trusted operation environment 18 via the service 4 (e.g. via the VMM).

At S106f, the trusted operation environment 18 uses (U) and one or more of the parameters (m, b) to calculate shared key (K).

The device 2 and trusted operation environment 18 (e.g. HW and/or SW components thereof) can then exchange protected communications (e.g. encrypted using key (K)) which are opaque or not accessible to hardware/software components outside of the trusted operation environment 18. When a particular communication session ends, a further negotiation can take place to derive updated cryptographic key(s) as required.

At S108, the boot manager code 20 transmits, to the device 2, a trust request comprising an attestation report which includes verification data to allow the relying resource to verify one or more attributes or characteristics of the trusted operation environment.

At S110 the device validates the attestation report. As above, whilst the device 2 could validate the attestation report itself the device 2 may also communicate with an attestation service 22 to validate the attestation report. (not shown)

When the attestation report confirms the attestation report is valid/as expected then the device 2, at S112, transmits boot data to the trusted operation environment 18. As above, in view of communications transmitted during the communication secure session being cryptographically secure, the boot data transmitted to the trusted operation environment 18 is not accessible to the HW/SW components outside of the trusted operation environment.

Looking at FIG. 5a and FIG. 3, the boot data comprises parameters, instructions and/or variables for the boot manager and boot credential data required to access the encrypted OS code and complete the boot sequence.

In a further embodiment, as depicted at FIG. 4 above and FIG. 5b (described below), different portions of the boot data may be provisioned into the trusted operation environment 18 at different times, dependent, for example, on the security requirements of the service/device.

At S114a, the boot manager code accesses the received boot data and obtains the parameters, instructions and/or variables to advance the boot sequence. The boot manager may also verify that the boot data is from a trusted source by, for example, decrypting the boot data and/or verifying a signature on the boot data.

At S116a, the boot manager code loads the OS loader 24 into the trusted operation environment 18 and runs the OS loader 24.

At S118a, the OS loader 24 accesses the credential boot data provisioned by the device 2 and decrypts encrypted OS code (e.g. comprising a Kernel and Root File System).

At S120a, the OS loader 24 loads the decrypted OS code into memory (e.g. volatile memory) of the trusted operation environment and runs the decrypted OS code.

At S122a, the device 2 is depicted as communicating with the trusted operation environment 18 which provides the requested functionality.

Looking at FIG. 5b, the boot data provisioned at S112 comprises a first portion of the boot data which includes, for example, parameters, instructions and/or variables for the boot manager code.

At S114b, the boot manager code accesses the received first portion of the boot data and obtains the parameters, instructions and/or variables to advance the boot sequence. The boot manager code may also verify that the first portion is from a trusted source by, for example, decrypting the boot data and/or verifying a signature thereon.

At 116b, the boot manager code determines that further boot data is required to complete the boot process.

At S118b, the trusted operation environment obtains (e.g. from the trust compute base) a further trust request and at S120b sends, to the device 2, the further trust request which includes a further attestation report comprising verification data to allow a relying resource to verify one or more updated attributes or characteristics of the trusted operation environment.

At S122b, the device 2 obtains a further validation result. As above, the device 2 may process the further attestation report or send to an attestation service for processing.

When the further attestation result confirms that the further attestation report is valid/as expected then the device 2, at S124b, provisions further boot data to the trusted operation environment 18, where, in the present illustrative example, the further boot data comprises credential boot data to provide access (e.g. decrypt/verify) to encrypted OS code required to provide the requested functionality. Furthermore, as the communication comprising the further boot data is protected by the device 2 (e.g. encrypted and/or signed by the device 2) using the negotiated credential data, HW/SW components (e.g. the VMM 12, hypervisor 14) outside the trusted operation environment 18 cannot access the further boot data.

At S125b, the boot manager loads the OS loader 24 into the trusted operation environment (e.g. from a non-secure memory region on the service 4) and runs the OS loader 24.

At S126b the OS loader 24 running in the trusted operation environment 18 accesses credential data in the further boot data and at S128b decrypts encrypted OS code (e.g. comprising a Kernel and Root File System).

At S128b the OS loader 24 loads the decrypted OS code into the trusted operation environment 18 and runs the decrypted OS code to provide the requested confidential virtual machine functionality.

At S130b, the device 2 is depicted as communicating with the realm running the OS which provides the requested functionality.

Figure 6:
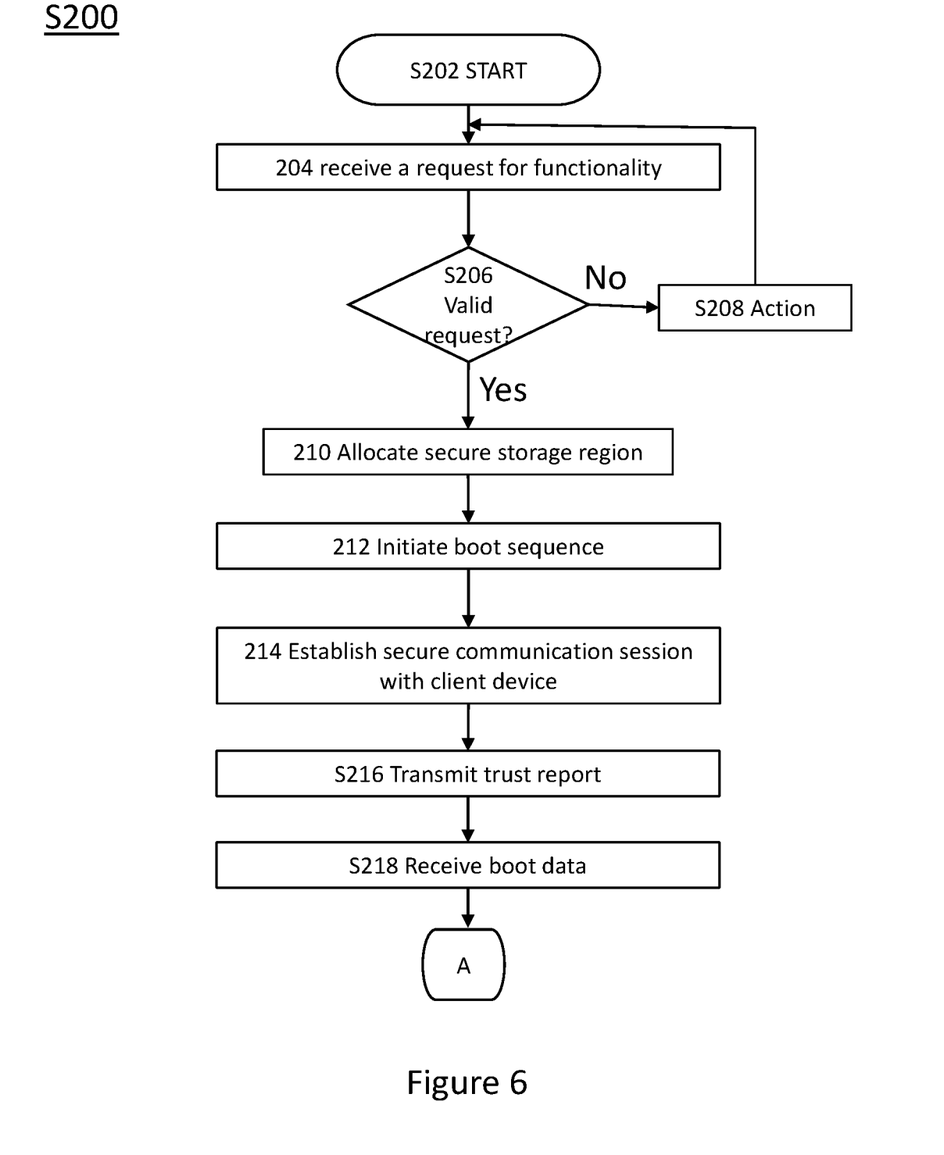
FIG. 6 depicts an example process in which a trusted operation environment on the service is securely provisioned with data.

FIG. 6 depicts an example process 200 in which a trusted operation environment on a host service is securely provisioned with confidential data.

At S202, the process starts.

At S204, the service receives, from a device, a request for functionality, where such a request may be for a confidential virtual machine.

At S206, the service processes the request from the device and determines whether or not the request is valid. Such a determination may be based on credential data provided in the request (e.g. device credentials or device identifiers) and, when determined to be a invalid request (e.g. because of untrusted device credentials) then, at S208, the service performs an action such as terminating the communications with device.

When the request is determined to be a valid request the service, at S210, allocates a trusted operation environment for a realm to provide the requested functionality. Such an allocation may be managed or controlled by, for example, a VMM in collaboration with one more hypervisor(s) on the service.

At S212, a boot sequence or process is initiated (e.g. by VMM) by loading boot manager code (e.g. UEFI code) into the trusted operation environment allocated to the realm, where the boot manager code is to manage a boot sequence and load the appropriate code (e.g. an OS loader, OS code etc.) into the trusted operation environment required to provide the requested functionality (e.g. the confidential virtual machine).

At S214, the trusted operation environment and device establish a secure communication session, by for example undertaking a negotiation to agree on one or more cryptographic key(s) which can be used for encrypting/decrypting and signing/verifying communications transmitted therebetween during the communication session. Such a negotiation may use, for example, the Diffie-Hellman (DH) key exchange as previously described, although any suitable negotiation may be used to establish cryptographic keys.

At S216, the code (e.g. the boot manager code) transmits from the trusted operation environment, to the device 2, a trust request for data.

As above, the trust request may comprise an attestation report which includes verification data to allow a relying resource to verify one or more attributes or characteristics of the trusted operation environment.

When the device positively validates the attestation report (i.e. confirms the attestation report is valid/as expected) then the device, at S218, provisions boot data to the trusted operation environment. As above, in view of the secure communication session established between the device and the trusted operation environment, the boot data provisioned to the trusted operation environment allocated to the realm is not accessible to HW/SW components outside of the trusted operation environment.

The boot data may comprise parameters, instructions and/or variables for the boot manager and may also comprise boot credential data to allow HW and or SW components of the trusted operation environment to access protected resource(s) at the service (e.g. encrypted OS code in a non-secure region of memory at the service).

At S220, the boot manager code progresses the boot sequence using the boot data received.

At S222, it is determined (e.g. by the boot manager code), whether or not all boot data required to complete the boot sequence and provide the requested functionality has been received. For example, the boot data required to access the OS code may not be available. For example, the boot credential data required to decrypt and/or verify the OS code may not yet be provisioned into the trusted operation environment.

In embodiments, the boot data already provisioned into the trusted operation environment (e.g. at S218) may specify instructions for the boot manager code on how to obtain the further required boot data or the boot manager code may have instructions for obtaining the further required boot data pre-provisioned thereon. For example, the already provisioned boot data may comprise credential data to enable the realm to establish secure communications with other entities to obtain the further boot data as required.

In an embodiment, when it is determined that further boot data (e.g. boot credential data) is required, the boot manager code, at S224, transmits a further trust request for the remaining portion(s) of boot data and, at S226, receives requested further boot data and progresses the boot sequence using the further boot data.

At S228, it is determined (e.g. by the boot manager code), whether or not all boot data required to complete the boot sequence and provide the requested functionality has been received.

When further boot data is required the service returns to S224.

When the required boot data to complete the boot process is provisioned at the trusted operation environment the OS loader code is loaded into the trusted operation environment. At S232, the OS loader code accesses (e.g. decrypts) and loads the required OS code into storage (e.g. volatile memory) at the trusted operation environment allocated for the realm and, at S234 executes the OS code to provide the requested functionality.

At S236, the process ends.

Figure 7:
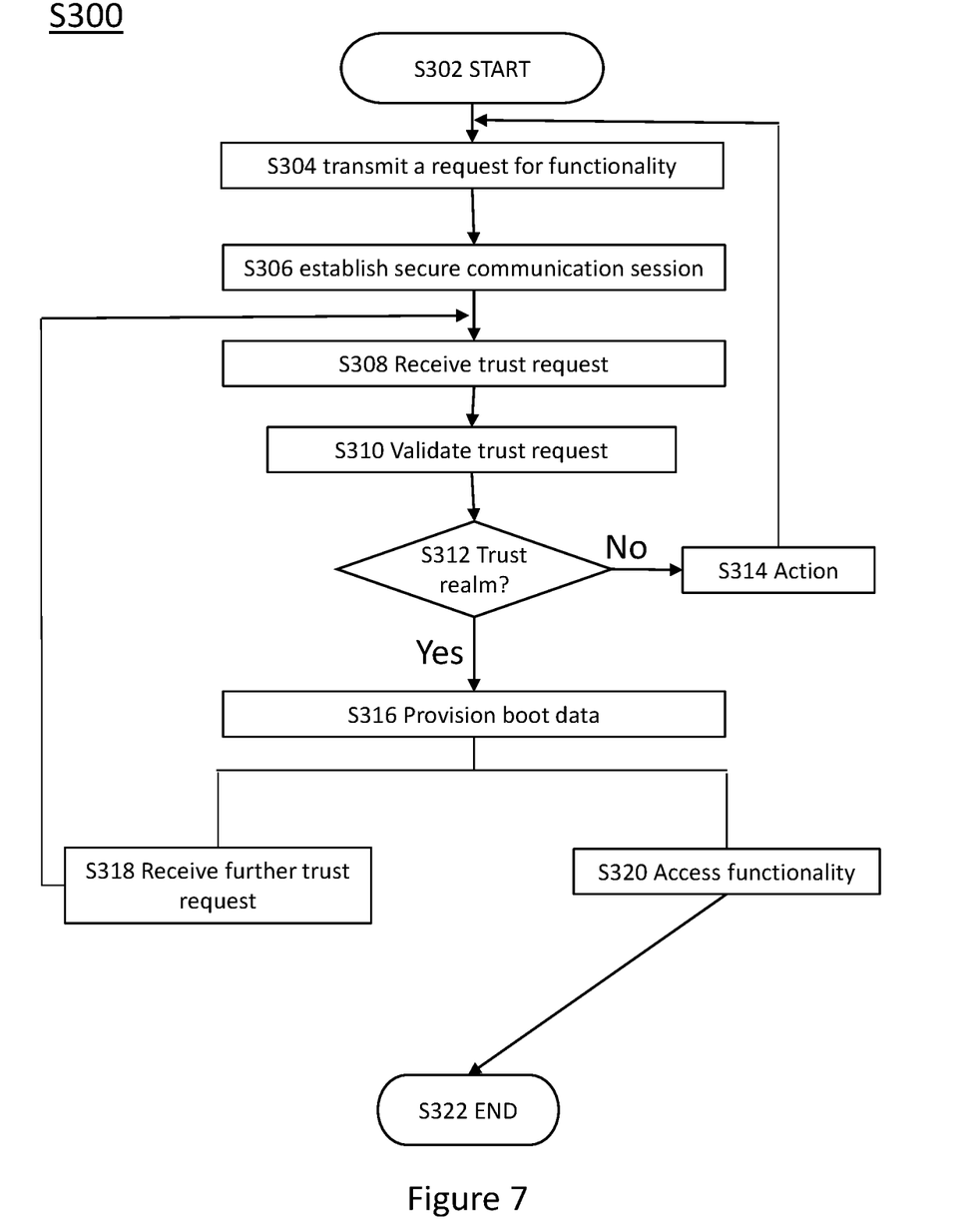
FIG. 7 depicts an example process in which the device securely provisions the service with data.

FIG. 7 depicts an example process 300 in which a device securely provisions a service with confidential data.

At S302, the process starts.

At S304, the device transmits, to a service, a request for functionality, where such a request may be for a confidential virtual machine.

At S306, the device establishes a secure communication session with a realm (e.g. a trusted operation environment allocated to the realm) on the service, for example, by undertaking negotiations to agree on one or more cryptographic keys which can be used for encrypting/decrypting and signing/verifying communications transmitted therebetween during the communication session.

At S308, the device receives, from the realm, a trust request which includes verification data to allow the device to verify the one or more attributes or characteristics of the trusted operation environment.

At S310, the device validates the trust request to determine if the realm is trusted. For example, the trust request may comprise an attestation report where, validating the trust request comprises sending the trust request to a trusted attestation service remote therefrom.

At S312, when the device determines that the realm cannot be trusted, then the device, at S314 takes an action such as terminating communications with the realm and resending the request for functionality.

At S312, when device determines that the realm can be trusted, the device, at S316, provisions the some or all of the requested data on the realm.

At S318, when further trust requests the device processes the further trust requests as at S308.

At S320, the device is provided with the requested functionality and, at S322, the process ends.

As will be appreciated, the present techniques provide a mechanism for provisioning secure data into a trusted operation environment allocated for an owner process or realm. Such secure data may be provisioned during the boot process, where the data is secured using credential data (e.g. encryption keys) negotiated between the realm and the device.

Such functionality means that whilst boot manager code loaded into the trusted operation environment can initiate the boot process, the boot process can only complete after secure boot data is provisioned into the trusted operation environment. Thus, entities (e.g. customer devices) relying on the functionality provided by the trusted operation environment at the host service can securely provision the boot data into the trusted operation environment and have a level of comfort that the code running within that trusted operation environment is not malicious code.

Furthermore, as the data may be protected using cryptographic keys negotiated between the device and the trusted operation environment, the communications comprising the provisioned data and the provisioned data itself cannot be accessed by HW/SW components (e.g. the VMM 12, hypervisor 14) outside the trusted operation environment.

Furthermore still, the data (e.g. the boot data) used by the trusted operation environment can be updated by an authorised party (e.g. an owner of the device) before being provisioned into the trusted operation environment. Thus, updates to the data can be made in a secure manner as required. Thus a customer of the service can control their data/code in the trusted operation environment without the HW/SW components of the service accessing the data/code.

Furthermore, the above described techniques enable operation environment with relatively limited resources and communications capabilities to establish a secure communications session with a remote resource, and, thus, to be securely provisioned with code to provide greater resources/functionality.

Furthermore, the techniques allow for the code required for the boot sequence (e.g. OS loader code, OS code) to be securely stored (e.g. encrypted) in different parts of storage (e.g. non-volatile memory) at the service, where different keys are required to be provisioned to the trusted operation environment from a trusted resource (e.g. device) to allow HW and/or SW components of the trusted operation environment to access the different portions of code. As each of the different keys may be provisioned to the trusted execution environment in response to trust requests at different times during the boot process, the remote resource can verify the attributes/characteristics of the trusted operation environment at each point in the boot sequence before provisioning the required keys to access the requested portions of code.

Furthermore, the functionality means that any boot data update can be managed by the customer of service via the device and the service owner does not have to be involved. As an example when the boot credential data comprises a SBKD for UEFI boot manager code, then SBKD would generally need to be updated after an OS code update (e.g. re-signed with credential data). However rather than the owner of the host service managing the update, the customer of the service (e.g. the owner of the device) could securely provision the updated SBKD to the trusted operation environment from the device.

Although the data provisioned into the trusted operation environment is generally described above as being boot data comprising parameters, instructions, variables and/or credential data, it will be appreciated that the claims are not limited in this respect. For example, the data may be, for example, the OS code, the OS loader code or any suitable data.

The techniques further provides processor control code to implement the above-described systems and methods, for example on a general purpose computer system or on a digital signal processor (DSP). The techniques also provides a carrier carrying processor control code to, when running, implement any of the above methods, in particular on a non-transitory data carrier-such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended items.

The invention claimed is:

1. A computer implemented method of securely provisioning data to a trusted operation environment hosted on a service, the method performed at the service, comprising:
    receiving, from a remote resource, a request for functionality at the service;
    allocating a trusted operation environment in response to the request;
    loading boot manager code into the trusted operation environment to manage the boot sequence;
    initiating a boot sequence at the trusted operation environment;
    establishing a secure communication session between the trusted operation environment and the remote resource;
    transmitting, from the trusted operation environment to the remote resource, a request for data;
    receiving, at the trusted operation environment, the requested data;
    accessing, at the trusted operation environment, the received data;
    progressing, at the trusted operation environment, the boot sequence using the received data;
    determining, with the boot manager, whether the boot data required to complete the boot process has been received;
    transmitting, from the trusted operation environment to the remote resource, a further request for data when it is determined that further data is required to progress the boot sequence;
    receiving, at the trusted operation environment, the further requested data; and
    progressing the boot sequence using the received further data.

2. The method according to claim 1, where the received data comprises boot data to progress the boot sequence, and where the boot data comprises one or more of parameters, instructions, variables and/or credential data.

3. The method of claim 1, where the received requested data is encrypted with one or more cryptographic keys and where accessing the received data comprises decrypting the received data using one or more corresponding cryptographic keys accessible to the trusted operation environment.

4. The method of claim 1, where the request for data comprises a trust request which includes verification data to allow a relying resource to verify one or more attributes or characteristics of the trusted operation environment.

5. The method of claim 1 further comprising:
loading an operating system (OS) loader located outside the trusted operation environment into the trusted operation environment.

6. The method of claim 5 further comprising:
decrypting, using the boot credential data, encrypted OS code located outside of the trusted operation environment; and
running the OS code in the trusted operation environment.

7. The method of claim 1, where the boot data comprises instructions for the boot manager code to obtain further required boot data.

8. The method of claim 1, where the request for functionality comprises a request for the service to host a virtual machine for the remote resource.

9. The method of claim 1, where the virtual machine is the owner of the trusted operation environment.

10. The method of claim 1, where the boot manager code comprises UEFI code.

11. A non-transitory computer readable storage medium comprising code which when implemented on a processor causes the processor to carry out the method of claim 1.

12. A computer implemented method of securely provisioning data to an operation environment hosted on a service, the method performed at a resource remote from the service comprising:
establishing a secure communication session with an operation environment hosted at the service, and where the operation environment is to perform a boot sequence;
receiving, from the operating environment during a boot sequence, a request for boot data;
validating the request;
provisioning, at least a portion of the boot data to the operating environment, based on or in response to a result of the validation;
receiving, from the operating environment, a further request for data when further data is required to progress the boot; and
sending the further requested data.

13. The method of claim 12, where the request for boot data includes an attestation report.

14. The method of claim 13, wherein validating the request comprises transmitting the attestation report to an attestation resource.

15. The method of claim 12, further comprising encrypting the boot data using a cryptographic key negotiated during the secure communication session.

* * * * *